July 7, 1959

T. R. PERZENTKA 2,893,729

SHEET SEPARATING MECHANISM FOR DUPLICATORS

Filed April 29, 1957

INVENTOR.
Thomas R. Perzentka
BY
Ooms, McDougal, Williams & Hersh
Attorneys

United States Patent Office 2,893,729
Patented July 7, 1959

2,893,729

SHEET SEPARATING MECHANISM FOR DUPLICATORS

Thomas R. Perzentka, Niles, Ill., assignor to A. B. Dick Company, Chicago, Ill., a corporation of Illinois Application April 29, 1957, Serial No. 655,915

12 Claims. (Cl. 271—21)

This invention relates to duplicators or other printing machines, and pertains particularly to mechanisms for separating and feeding the topmost sheet from a paper stack.

One object of the present invention is to provide a new and improved separating mechanism that affords a high degree of convenience and ease of operation in adjusting the mechanism to accommodate sheets of various widths.

A further object is to provide a new and improved sheet separating mechanism having corner separators and sheet advancing means, together with convenient means for raising the separators and the sheet advancing means, so that a stack of paper may be placed on the feed table with great ease and convenience.

It is a further object to provide a new and improved sheet separating mechanism of the foregoing character and having means for adjusting the force exerted on the paper sheets by the sheet advancing means.

Further objects and advantages of the present invention will appear from the following description, taken with the accompanying drawings, in which.

Figures 1, 11, 12:
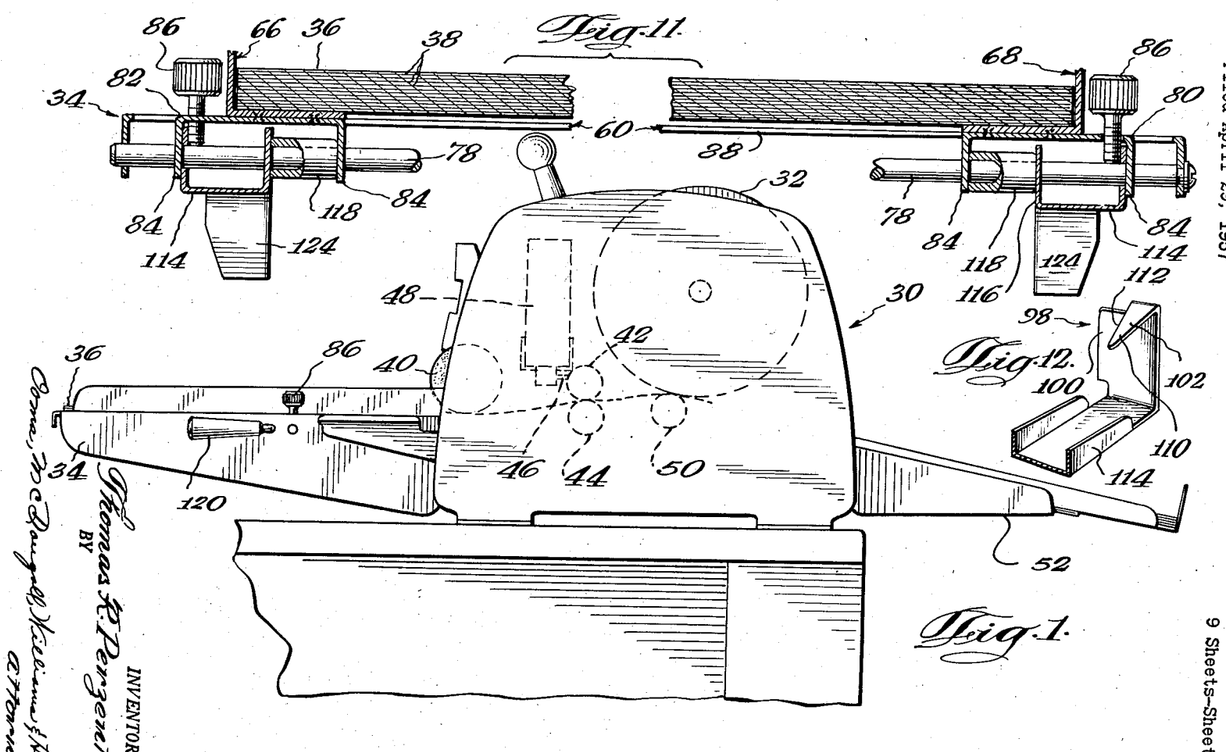
Fig. 1 is a side elevational view of a duplicator equipped with a sheet separating mechanism which will be described as one illustrative embodiment of the present invention.
Fig. 11 is an elevational sectional view through the feed table, taken generally along a line 11—11 in Fig. 2.
Fig. 12 is a fragmentary perspective view of one of the corner separators embodied in the mechanism of Figs. 1–11.

As already noted, Fig. 1 illustrates a duplicator or printing machine 30, which may be of any suitable type, but is illustrated as a duplicator of the liquid process type adapted to transfer impressions from a reversely printed master sheet to moistened copy sheets. It should be understood that the sheet separating mechanism of the present invention is applicable to any type of duplicator or printing machine adapted to print impressions on separate sheets.

Thus, the liquid process type duplicator 30 will be described in a general way, merely by way of example. It will be seen that the illustrated duplicator 30 comprises a rotatable master drum or cylinder 32, adapted to carry the master sheet. A feed table 34 is provided to support a stack 36 of paper sheets 38. Various means may be employed to advance the paper sheets 38 from the feed table 34. In this case, the advancing movement of the sheets 38 is brought about by a pair of feed rollers 40, adapted to feed the topmost sheet between a pair of combination moistening and forwarding rollers 42 and 44. The upper forwarding roller 42 is suitably moistened, as by means of a wick or pad 46 supplied with moistening liquid by a tank or bottle 48.

The roller 42 and 44 forward the moistened sheet between the master cylinder 32 and an impression roller 50. Finally, the printed sheet is discharged onto a receiving tray.

While it would be feasible to employ a single feed roller or other sheet advancing element, two feed rollers 40 are actually employed in the present case in order that the rollers may engage the paper sheets 38 adjacent to the extreme lateral edges of the sheets. Any lint or the like that may be stirred up by the feed rollers is then generally outside of the area to be printed.

In this case, the feed rollers 40 are made of rubber, or other suitable frictional material, and are mounted for slidable adjusting movement on a transverse operating shaft 54 of square or other non-circular cross-section. It will be seen that the shaft 54 is supported for generally vertical swinging movement by a pair of arms or carriages 56 and 58. Means are provided for intermittently advancing the shaft 54, in timed relation to the rotation of the cylinder 32, so that the paper sheets 38 will be advanced from the feed table 34 and will arrive at the cylinder 32 in proper registration with the master sheet. Such means are well known to those skilled in the art and need not be described or illustrated. Moreover, the exact construction of such means is not material to the present invention.

Figure 2:
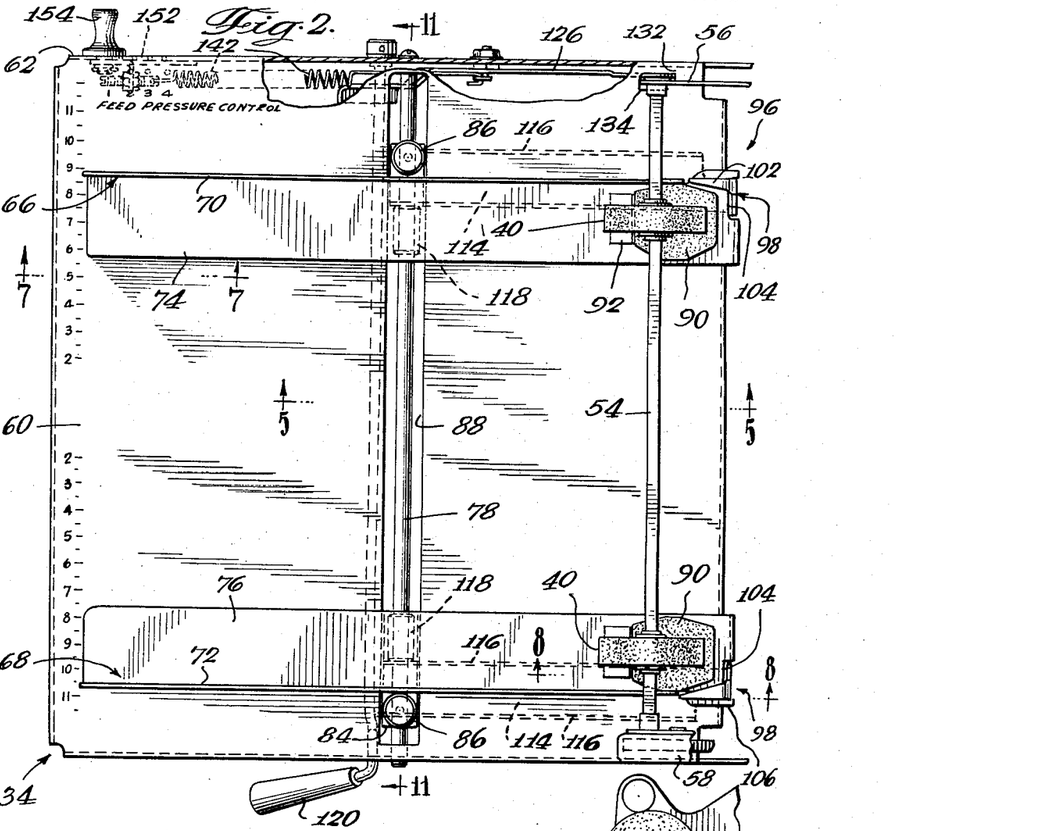
Fig. 2 is a top plan view of the feed table for the duplicator of Fig. 1.
Figures 3, 3A:
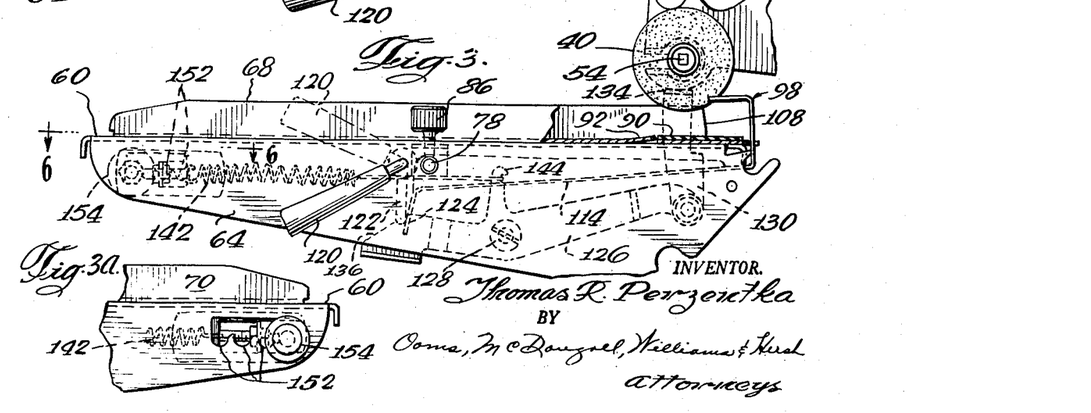
Fig. 3 is a right side elevational view of the feed table, showing the separators and the sheet advancing means in raised positions, without any paper on the feed table.
Fig. 3a is a fragmentary left side elevational view.

The feed table 34 may be arranged in various ways, but is illustrated as a substantially horizontal sheet metal platform 60, with depending side flanges 62 and 64 at the opposite lateral edges thereof. Any suitable means may be employed to mount the feed table 34 on the duplicator 30.

In order to position and guide the lateral edges of the paper sheets 38, the feed table 34 is equipped with left and righthand side rails 66 and 68, which are adjustable laterally to accommodate paper sheets of various widths. As illustrated, the side rails 66 and 68 are in the form of sheet metal angles, having upright flanges 70 and 72 and substantially horizontal flanges 74 and 76, which are in sliding engagement with the feed table platform 60. Various arrangements may be utilized to retain the side rails 66 and 68 on the feed table 34, while providing for lateral adjustment of the rails. In the illustrated construction, the side rails 66 and 68 are guided by a rod 78 which extends transversely between the side flanges 62 and 64, under the feed table platform 60. U-shaped brackets 80 and 82 are welded or otherwise secured to the horizontal side rail flanges 74 and 76 and are slidably mounted on the rod 78. It will be seen that each of the brackets 80 and 82 is formed with a pair of lateral spaced depending lugs or flanges 84 which are apertured for sliding movement along the rod 78. A set screw 86, or some other suitable locking device, may be mounted on each bracket 80 and 82 to lock the corresponding side rail in adjusted position. It will be understood that the guide rod 78 maintains the side rails 66 and 68 in parallel longitudinally extending positions, throughout the range of lateral adjustment of the side rails. From Fig. 2, it will be seen that a transversely extending slot 88 is formed in the feed table platform 60 to afford passage for the side rail slide brackets 80 and 82.

It will be understood that the paper stack 36 is received on the feed table 34 between the side rails 66 and 68, as shown in Fig. 11. In this case, frictional retention for the lowermost sheet in the stack is provided by a pair of friction pads 90 on the horizontal side rail flanges 74 and 76. The pads may be made of rubber, cork, a combination thereof, or other suitable frictional material. Ramps 92 are struck upwardly from the horizontal side rail flanges 74 and 76 immediately behind the pads 90, to prevent the front edges of the lower sheets in the stack from catching on the rear edges of the pads 90.

In order to provide for separation of the topmost sheet from the remainder of the stack 36, the duplicator 30 is provided with a sheet separating mechanism 96, preferably comprising left and righthand corner separators 98, disposed at the extreme front corners of the paper stack 36, although in some cases a single corner separator at one of the front corners might suffice. As shown most clearly in Fig. 12, each corner separator 98 comprises a generally vertical front stop plate 100, adapted to be positioned for engagement by the front edges of the paper sheets 38, adjacent to the front corners of the stack 36, together with a generally horizontal lip 102 which projects rearwardly from the upper end of the front stop 100 and is adapted to rest upon the topmost sheet at the corner of the stack. It will be apparent that each front stop 100 takes the form of a flat strip or plate made of sheet metal or the like and disposed in a generally vertical position at the front end of the corresponding side rail. The front stop 100 is generally parallel to the front edge of the stack 36 and is arranged to project inwardly of the corresponding upright side rail flange 70 or 72 so as to be positioned in front of the stack at the corner thereof. From Fig. 2, it will be seen that a notch 104 is formed in the front edge of each of the horizontal side rail flange 74 and 76 to afford passage for the corresponding front stop 100, and to maintain the corner separator 98 in the proper position relative to the corresponding side rail. At the front end of each of the side rails 66 and 68, each of the horizontal flanges 74 and 76 is widened by an outwardly projecting extension 106. The upright side rail flange 70 and 72 are cut away at the front end of the side rails to define notches or openings 108 affording clearance or free passage for the corner separator lips 102.

It will be seen that the lip 102 on each corner separator 98 is generally triangular and is arranged to taper rearwardly to a point 110. Each lip 102 thus has a diagonal inner edge 112 adapted to cut obliquely across one front corner of the topmost sheet.

The corner separators 98 are mounted for generally vertical movement so that they will follow the top of the stack downwardly as the stack is depleted. In this case, each corner separator 98 is mounted on an arm 114 which is pivoted rearwardly of the corner separator. In the illustrated arrangement, the arms 114 are pivotally mounted on the rod or shaft 78 which also guides the movement of the side rails 66 and 68, although the arms 114 might be mounted on independent pivots. It will be seen that each arm 114 is channel-shaped for rigidity and thus is formed with a pair of flanges 116. The rear portions of the flanges 116 are apertured to receive the rod 78. In order that the corner separators 98 may be moved laterally along with the side rails 66 and 68, the arms 114 are mounted on the rod 78 between the depending flanges 84 on the side rail side brackets 80. A spacer 118 is employed in this case between the inner flange 116 on each arm 114 and the inner flange 84 on the corresponding bracket 80. In this way, the arms 114 will be freely swingable, but will slide on the rod 78 along with the corresponding side rail bracket 80.

Figures 4, 5, 6, 7:
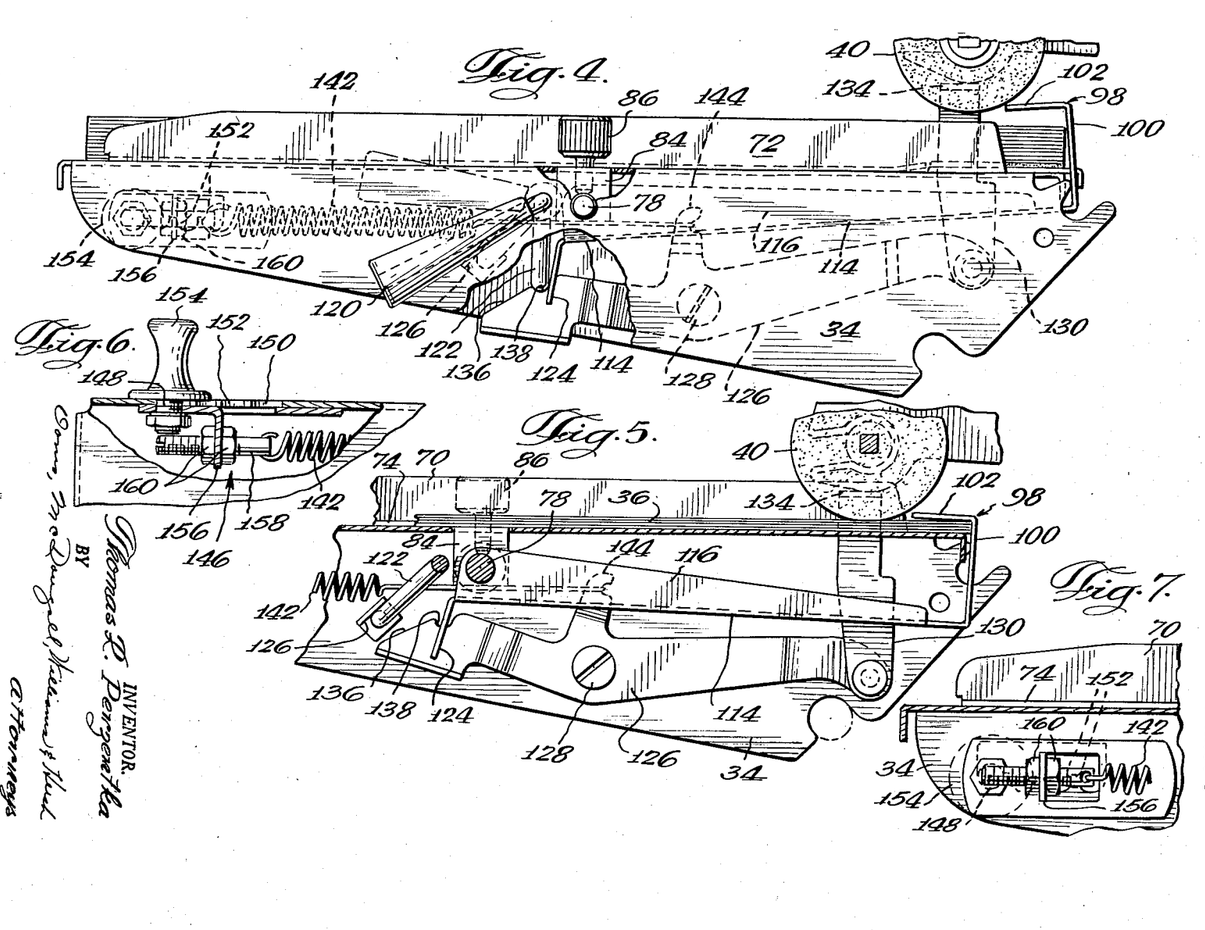
Fig. 4 is a somewhat enlarged side elevational view similar to Fig. 3, but showing a stack of paper sheets in place on the table, parts of the table being broken away.
Fig. 5 is a fragmentary elevational sectional view, taken generally along a line 5—5 in Fig. 2, and showing the feed table with the components of the sheet separating mechanism in their normal positions for feeding paper from the stack, the latter being shown partly depleted.
Fig. 6 is a fragmentary horizontal sectional view, taken generally along a line 6—6 in Fig. 3, with parts broken away.
Fig. 7 is a fragmentary vertical sectional view, taken generally along a line 7—7 in Fig. 2.
Figures 8, 9, 10:
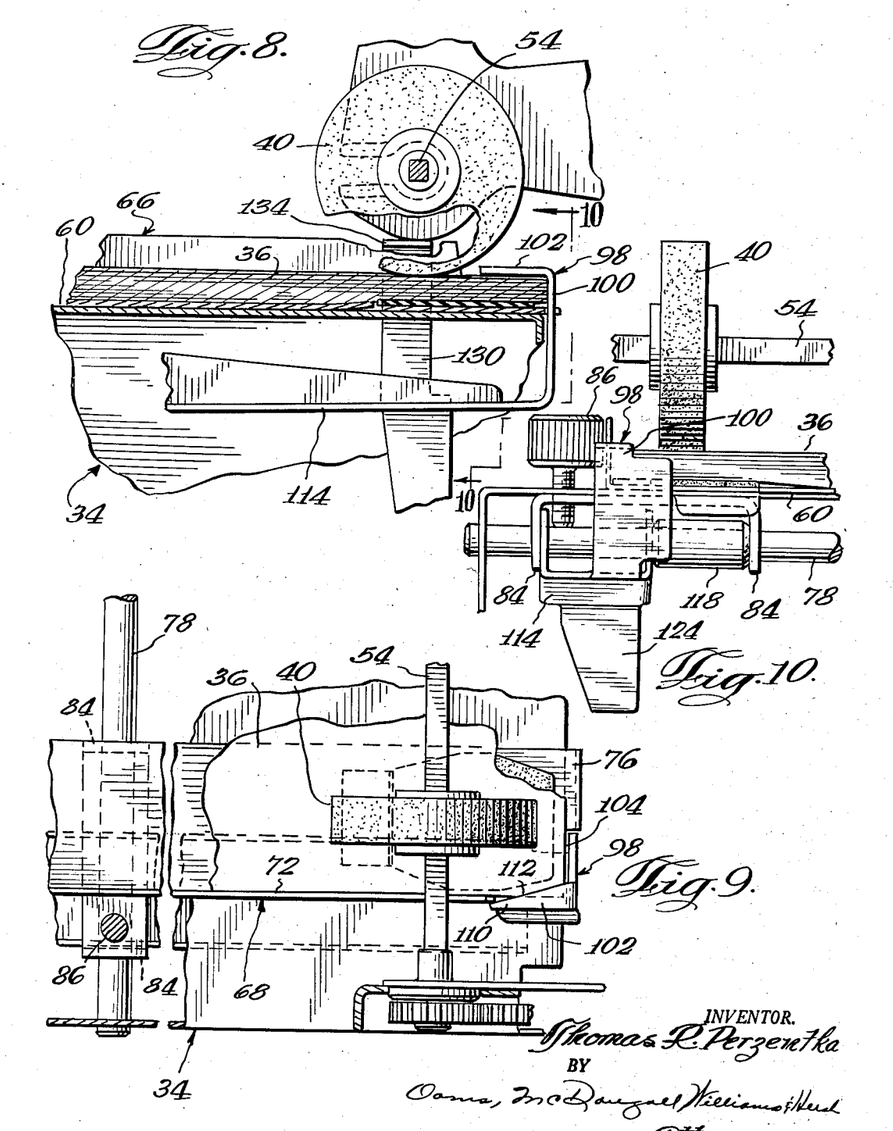
Fig. 8 is a fragmentary enlarged elevational sectional view, taken generally along a line 8—8 in Fig. 2, the view being similar to the right hand portion of Fig. 5.
Fig. 9 is a fragmentary top plan view showing one front corner of the feed table, with parts broken away.
Fig. 10 is a fragmentary end elevational view of the feed table, taken generally along a line 10—10 in Fig. 8.

A manually operable control member 120 is provided for raising the corner separators 98 and the feed rollers 40 so that a stack of paper may readily be slid into the proper position on the feed table 34. The stack 36 is inserted under the corner separator lips 102 as shown in Fig. 4, which illustrates the separators 98 and the rollers 40 in their raised positions.

In this case, the control member 120 takes the form of a lever which is pivotally mounted on the feed table side flanges 64. It will be seen from Fig. 4 that the illustrated lever 120 is provided with a crank portion 122 which is adapted to be swung against a depending flange or leg 124 on each of the supporting arms 114, so as to raise the corner separators 98. The lever 120 may be swung in the opposite direction to disengage the crank 122 from the legs 124 and thereby permit lowering movement of the corner separators 98. Such retracting movement of the lever 120 is limited by a stop bracket 126 on the feed table 34.

In order to provide for the raising of the feed rollers 40, the crank 122 is arranged to operate an additional lever 126, which is swingably mounted by means of a pivot 128 on the lefthand feed table flange 62. A push link 130 is pivotally connected to the front end of the lever 126 and is arranged to extend upwardly through an opening 132 in the feed table platform 60. It will be seen that the upper end of the link 130 is formed with a horizontal lug or flange 134 adapted to engage the lefthand feed roller arm or carriage 56. Thus, upward movement of the link 130 is effective to raise the feed rollers 40.

At its rear end, the lever 126 has a cam or ramp portion 136 which is engageable by the crank 122 on the control lever 120, so that the crank 122 will swing the lever 126 in a direction to raise the feed rollers when the corner separators 98 are raised. A detent notch 138 is formed adjacent to the upper end of the cam portion 136 to retain the control lever 120 when the feed rollers 40 and the corner separators 98 are in their raised positions.

The lever 126 and the link 130 are also employed to regulate the pressure between the feed rollers 40 and the paper stack 36. Thus, in this case, the lever 126 is yieldably biased in such a direction as to tend to lift the feed rollers and thereby reduce the pressure between the rollers and the stack. In the illustrated construction, a tension spring 142 is connected to an upwardly projecting arm 144 on the lever 126. The other end of the tension spring 142 is connected to an adjustable anchor 146 so that the tension in the spring can be regulated. It will be seen that the adjustable anchor 146 comprises a pin or bolt 148 which is slidable in a longitudinal slot 150 formed in the lefthand feed table side flange 62. A series of notches 152 is formed in the lower edge of the slot 150 to receive the pin in various adjusted positions. The pin 148 has an external portion 154 which serves as a handle. It will be seen from Figs. 6 and 7 that the pin is mounted in one leg of an angle bracket 156. An adjusting screw 158 extends through the other leg of the bracket 156 and is fitted with a pair of lock nuts 160 to maintain the adjustment of the screw 158. One end of the screw 158 is apertured to receive one end of the tension spring 142.

In operation the lips 102 of the corner separators rest upon the top of the stack 36 at the front corners thereof. The front stop portions 100 of the separators 98 are disposed in front of the stack at the corners. The normal operating position of the corner separators 98 is shown in Fig. 5, which illustrates the position of the separators when the stack is partly depleted.

To feed the topmost sheet from the stack, the rollers 40 are driven counter-clockwise, as seen in Fig. 5. Due to the interposition of the front stops 100 in front of the corners of the stack, the corners of the topmost sheet are buckled as the sheet moves forward. When the buckle becomes sufficiently pronounced, the corners of the sheet snap over the oblique edges 112 of the lips 102, whereupon the topmost sheet is entirely free from the top of the stack. The friction between the topmost sheet and the second sheet is not sufficient to buckle the second sheet around the corner separators 98. Thus, the topmost sheet is positively separated from the stack.

By moving the pin 148, the strength of the spring 142 may be varied so as to adjust the pressure between the feed rollers 40 and the stack. In this way, various weights and types of sheets may be fed. In general, less pressure is necessary and desirable between the feed rollers 40 and the paper stack for lightweight paper sheets than for heavy sheets. Excessive pressure is to be avoided because it may tend to cause the feeding of more than one sheet from the stack. However, the adjustment of the pressure is not critical. There is no difficulty in adjusting the pressure so that the sheets will be fed one at a time from the stack, until the entire stack has been fed, including the last sheet.

To place a new stack of sheets on the feed table 34, the lever 120 is swung downwardly so that the crank 122 will raise the corner separators 98 and will swing the lever 126 in such a direction as to raise the feed rollers 40, as shown in Fig. 4. The stack of sheets may then be slipped under the feed rollers 40 and the lips 102 of the corner separators 98. The side rails 66 and 68 may be moved laterally along the feed table so as to locate the stack in the desired position. It will be understood that the side rails 66 and 68 are adjusted so that the upright side rail flanges 70 and 72 are adjacent the edges of the stack. The corner separators 98 are carried along when the side rails 66 and 68 are adjusted. This assures that the proper relationship will be maintained between the corner separators 98 and the front corners of the stack. With the stack in place on the feed table 34, the lever 120 is swung upwardly to lower the corner separators 98 and the feed rollers 40. The sheet-separating mechanism is then ready for the feeding of sheets from the stack.

Figs. 13 through 24 illustrate a somewhat modified sheet-separating mechanism 170 that will be described as a second illustrative embodiment of the invention. In many respects, the second embodiment is similar to the first embodiment of Figs. 1–12. Thus, the second embodiment 170 comprises a feed table 172 in the form of a horizontal sheetmetal platform 174 having depending side flanges 176 and 178. Left- and right-hand side rails 180 are mounted on the feed table 172 for lateral adjustment along the feed table platform 174. As before, each side rail 180 has an upright flange 22 and a horizontal flange 184 which slides along the feed table platform 174. A U-shaped bracket 186 is mounted on the under side of each horizontal flange 184 and is slidable along a guide rod 188 extending transversely between the side flanges 176 and 178. Each bracket 186 has depending legs 190 and 192 which are apertured to receive the rod 188. A thumb screw 194 is mounted on each bracket 186 and is engageable with the rod 188 for clamping the corresponding side rail 180 in adjusted position. The brackets 186 are slidable along a transverse slot 196 formed in the feed table platform 174.

Figures 13, 21:
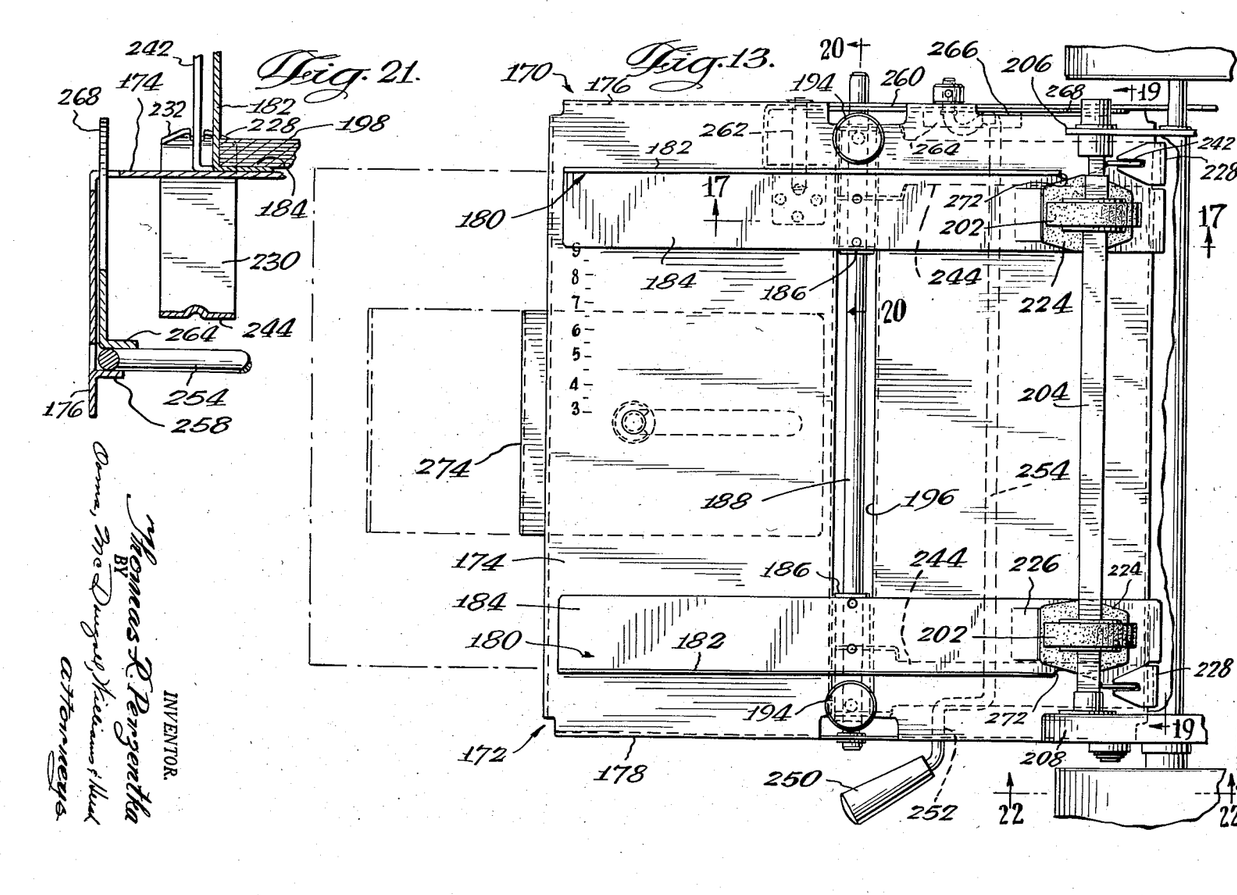
Fig. 13 is a top plan view of a somewhat different feed table, embodying a modified sheet separating mechanism that will be described as a second illustrative embodiment of the invention.
Fig. 21 is a fragmentary elevational sectional view taken generally along a line 21—21 in Fig. 13.
Figures 14, 15, 16:
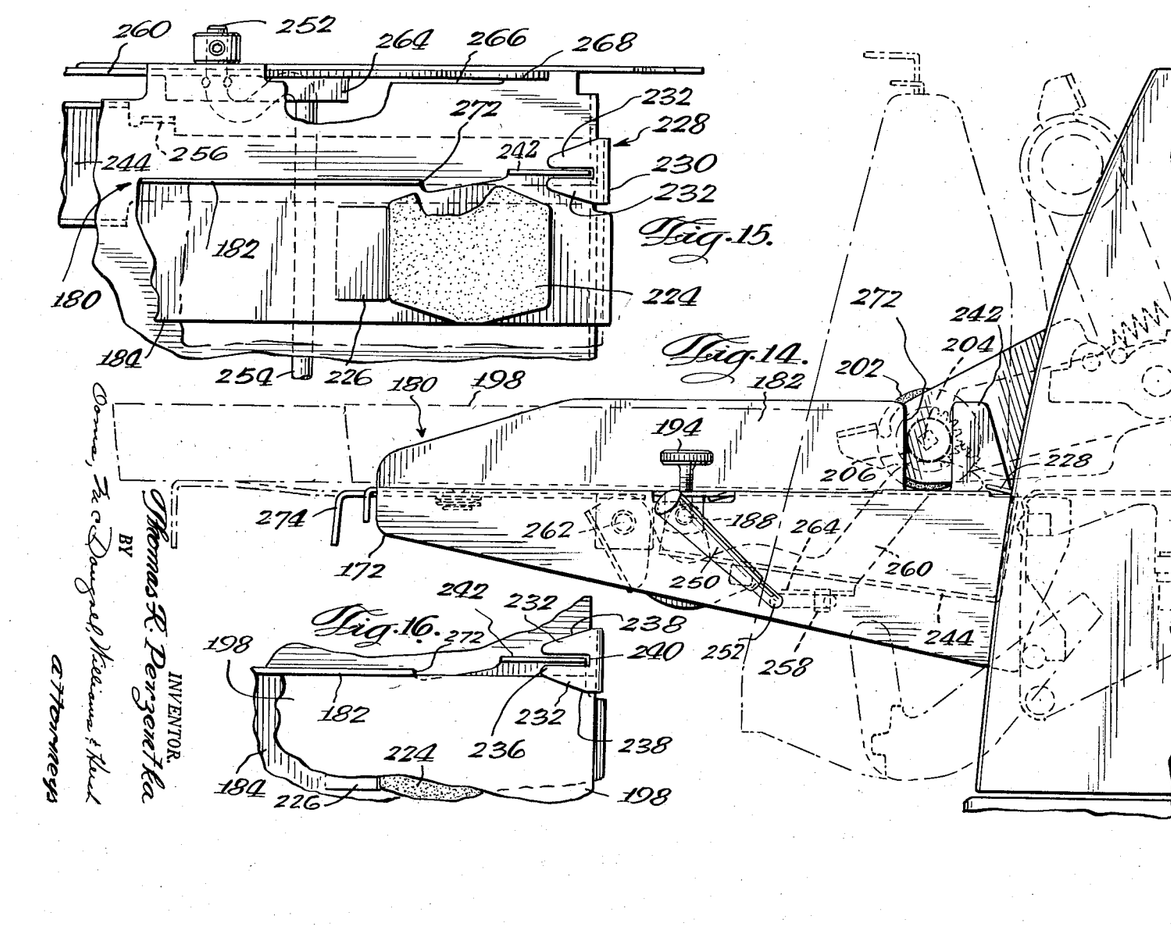
Fig. 14 is a side elevational view of the feed table of Fig. 13, shown mounted on a duplicator.
Fig. 15 is a fragmentary plan view showing one front corner of the feed table of Fig. 13, with parts broken away.
Fig. 16 is a view similar to Fig. 15, but with a paper stack in position on the feed table.

It will be understood that the feed table 172 is adapted to support a stack 198 of paper sheets 200. The stack 198 is positioned laterally by the side rails 180.

Various means may be employed for advancing the sheets 200 from the top of the stack 198, but, as in the first embodiment, the second embodiment 170 utilizes a pair of frictional feed rollers 202 adapted to engage the top of the stack 198 adjacent the upright side rail flanges 182. As before, the feed rollers 202 are mounted for slidable adjusting movement along a shaft 204 of square or other non-circular cross section. Left- and right-hand arms or carriages 206 and 208 support the shaft 204 for generally vertical swinging movement. Thus, the shaft 204 may be grasped manually and swung upwardly away from the feed table 172, to the inactive position shown in broken lines in Fig. 22. When the shaft 204 is normally positioned for the feeding of paper sheets, the rollers 202 rest upon the top of the stack and are movable downwardly as the stack is depleted.

Figures 22, 24:
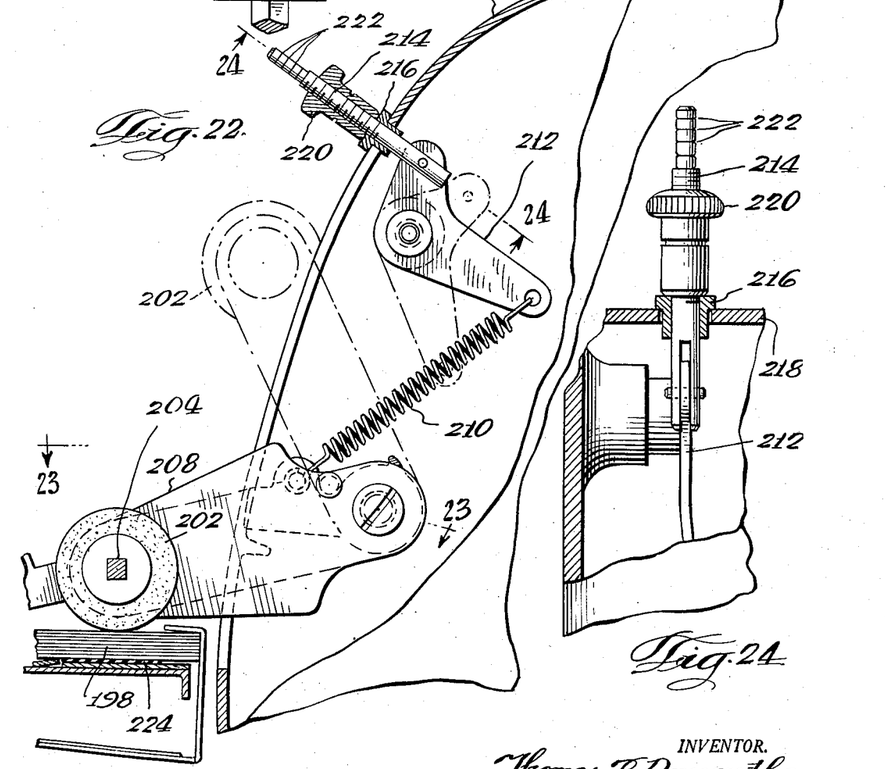
Fig. 22 is an elevational sectional view, taken generally along a line 22—22 in Fig. 13, and showing means for adjusting the pressure between the sheet advancing means and the paper stack.
Fig. 24 is a fragmentary enlarged sectional view, taken generally along a line 24—24 in Fig. 22.
Figure 23:
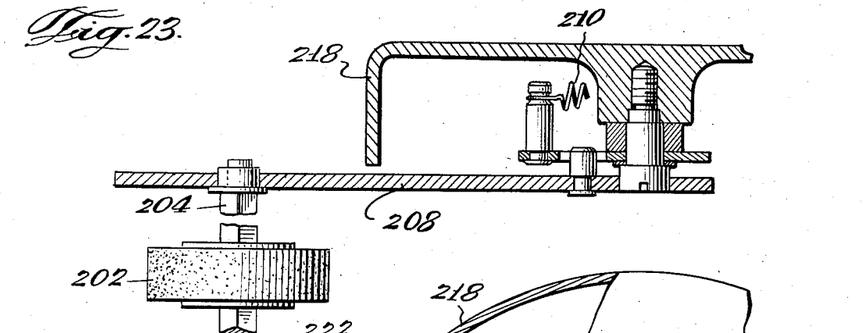
Fig. 23 is a fragmentary sectional view, taken generally along a line 23—23 in Fig. 22.

A somewhat modified arrangement is provided for adjusting the pressure between the feed rollers 202 and the paper stack 198. In this case, the weight of the rollers 202 is counter-balanced by a tension spring 210 which is connected between the carriage 208 and an adjustable lever 212. The position of the lever 212 may be adjusted by means of a screw 214 which is pivoted thereto and is arranged to extend through a fixed bushing 216 suitably mounted in a frame member 218 or the like. A nut 220 is mounted on the screw to adjust the position thereof and thereby vary the extent to which the spring 210 is tensioned. The outer end of the screw 214 may be provided with a series of annular markings 222 or other indicia so that the nut 220 may be re-set to any desired position.

As in the first embodiment, a friction pad 224 is mounted on each horizontal side rail flange 184 adjacent the front end of the side rail. A ramp 226 is formed on each side rail flange 184 immediately behind the pad 224. It will be noted that the normal position of each feed roller 202 is above the corresponding pad 224.

The second embodiment 170 is provided with corner separators 228 of somewhat modified construction. In this case, the corner separators 228 are symmetrical so that the left- and right-hand separators may be the same in construction. Thus, each corner separator 228 has a generally vertical front stop portion 230 which is adapted to be positioned in front of the corresponding front corner of the paper stack 198, so as to restrain the stack against forward movement. A pair of generally horizontal lips 232 project rearwardly from the upper end of each front stop 230. It will be seen that the right-hand lip 232 is actively utilized on the left-hand separator, while the left-hand lip 232 is actively employed on the right-hand separator. Each lip 232 is generally triangular in form with a rounded point 236 projecting rearwardly and with an oblique lateral edge 238 adapted to extend diagonally across the corresponding corner of the stack 198.

To position the corner separators 228 relative to the side rails 180, each separator is formed with a slot or notch 240 between the rearwardly projecting lips 232. Each side rail 180 has a vertical flange or guide 242 adapted to be received in the slot 240 in the corresponding separator 228. It will be seen that each flange 242 is located at the front end of the corresponding side rail 180 and is offset outwardly from the upright flange 182 which positions the edge of the paper stack 198. This arrangement of the flange 242 establishes the proper relationship between the active lip 232 and the corner of the stack 198, as shown to best advantage in Fig. 16.

The corner separators 228 are supported for generally vertical movement on the front ends of generally horizontal arms 244. In this case, the arms 244 are pivotally supported on the guide rod 188. Thus, each arm 244 is formed with a pair of spaced vertical flanges 246 and 248 which are apertured to receive the rod 188. The flange 248 is confined between the thumb screw 194 and the depending leg 192 on the corresponding side rail bracket 186 so that the arm 244 will be carried along when the side rail is adjusted laterally. As already indicated, the flange 242 on the front end of the side rail maintains the proper relationship between the corner separator 228 and the side rail, in any adjusted position of the side rail.

When sheets are to be fed from the stack 198, the lips 232 of the separators 228 rest upon the front corners of the stack. The action of gravity carries the separators downwardly as the stack is depleted.

Figures 17, 18:
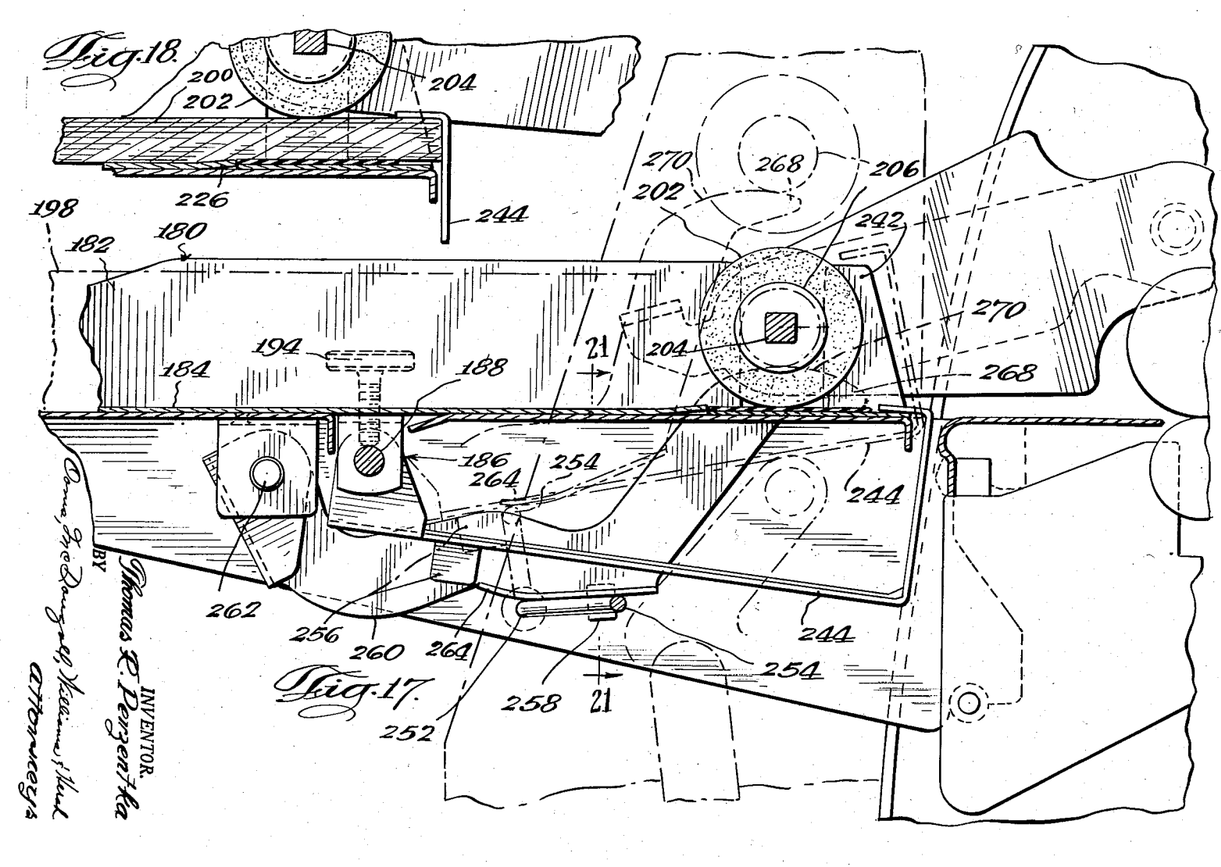
Fig. 17 is a fragmentary enlarged elevational sectional view through the feed table, generally along a line 17—17 in Fig. 13, the table being shown without any paper sheets thereon.
Fig. 18 is a fragmentary view similar to Fig. 17, but with a paper stack in place on the feed table and with the sheet supporting components in their normal positions for feeding sheets.

Means are provided to raise the separators 228 and the feed rollers 202 so that a fresh stack of paper may readily be placed on the feed table 172. In this case, the raising movement is effected by manual operation of the lever 250. It will be seen that the lever 250 is formed on a rotatable crank shaft 252 which extends transversely between the side flanges 176 and 178. A crank 254 is formed on the shaft 252 and is positioned so as to be swingable upwardly under the separator arms 244. Ears or other stops 256 are formed on the arms 244 to limit the swinging movement of the crank 254. From Fig. 17, it will be apparent that the crank 254 raises the arms 244 and passes over its uppermost, dead-center position before engaging the stops 256, with the result that the crank is retained in the raised position until it is returned manually to its lowered position. The return movement of the crank 254 is limited by stops 258 formed on the feed table 172. In Fig. 17, the lowered position of the crank 254 is shown in full lines, while the raised position is shown in broken lines.

In order to raise and lower the feed rollers 202, simultaneously with the raising and lowering movement of the corner separators 228, the crank 254 is arranged to operate a lever 260 swingable about a pivot 262 on the under side of the feed table 172. The lower edge of the lever 260 is provided with a shoe 264 which is adapted to be engaged by the crank 254. It will be seen that the lever 260 extends forwardly and upwardly through a slot 266 in the feed table platform 174 adjacent the left front corner thereof. The lever 260 has a front portion 268 which is movable upwardly under the left-hand feed roller carriage 206 so as to raise the feed rollers 202 when the hand lever 250 is swung downwardly. In Fig. 17, the raised position of the lever 260 is shown in broken lines, while the lowered position is shown in full lines. It will be noted that the end portion 268 of the lever 260 slides along the roller carriage 206 with a camming action as the lever 260 is swung upwardly. For this reason, the outer end portion 268 of the lever 260 is formed with a curved upper camming edge 270 which actually engages the carriage 206. The feed roller shaft 204 is movable upwardly and downwardly through a gap or slot 272 between the stack-positioning flange 182 and the guide flange 242 on each side rail 180.

In this case, the feed table 172 is provided with an extension 274 which is slidable outwardly so that the rear ends of long paper sheets will be adequately supported. The retracted and extended positions of the extension 274 are shown in full and broken lines in Figs. 13 and 14.

Figures 19, 20:
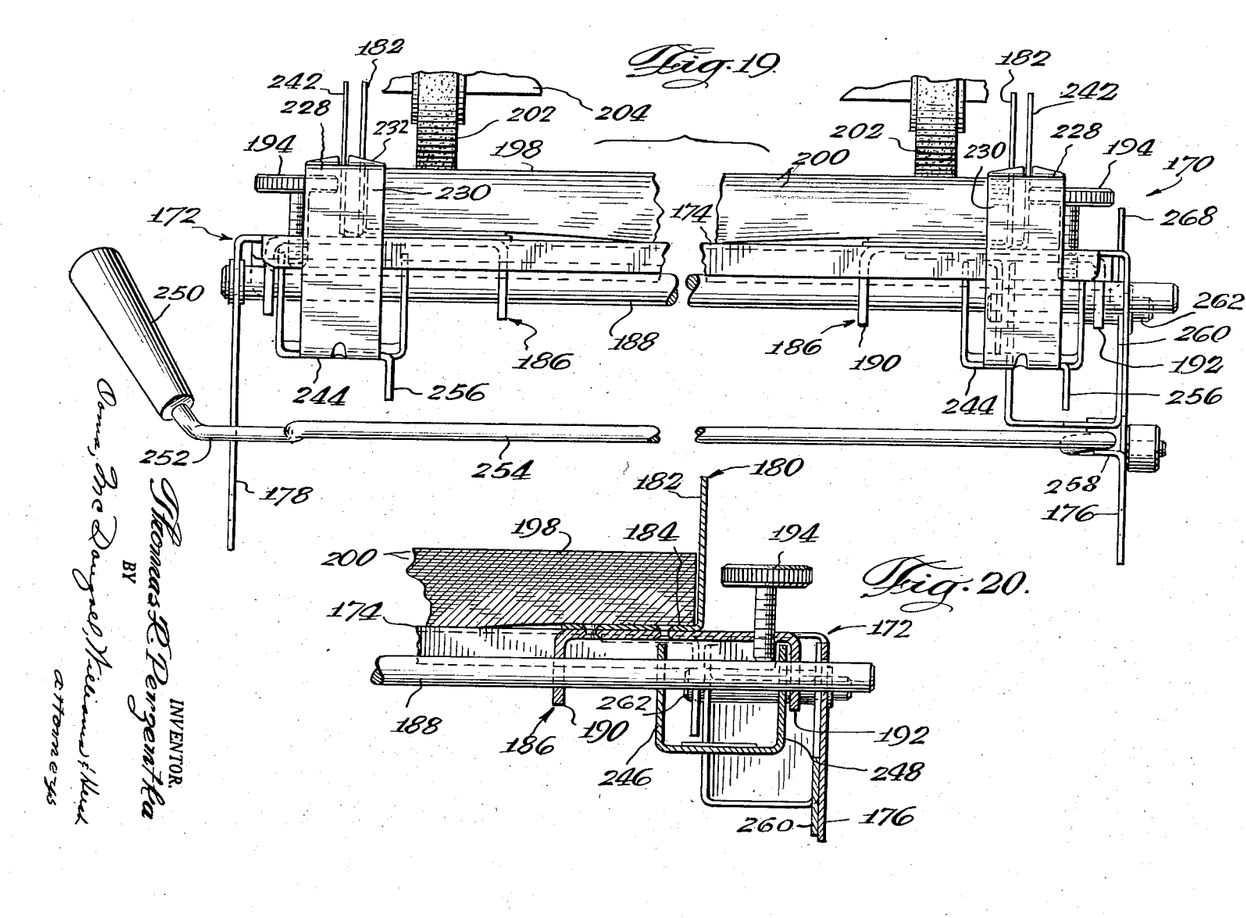
Fig. 19 is an end elevational view of the feed table, taken as generally indicated by a line 19—19 in Fig. 13.
Fig. 20 is a fragmentary elevational sectional view taken generally along a line 20—20 in Fig. 13.

The operation of the second embodiment 170 is much the same as that of the first embodiment. To load the feed table 172 with a stack of paper, the corner separators 228 and the feed rollers 202 are raised by swinging the hand lever 250 downwardly. The crank 254 connected to the hand lever 250 pushes the separator-supporting arms 244 and the roller-raising lever 260 upwardly. It is then an easy matter to slide the paper stack under the rollers 202 and the separator lips 232, until the front edge of the stack engages the front stops 230. The positions of the side rails 180 may be adjusted so that the upright side rail flanges 182 will be closely adjacent the edges of the stack. The corner separators 228 will be carried along laterally during any adjustment movements of the side rails 180. The feed rollers 202 may be slid along the shaft 204 so that they will occupy positions adjacent the outer edges of the stack, as shown in Figs. 13 and 19. The extension 274 may be pulled out if long paper sheets are to be fed.

To set the mechanism 170 for the feeding of paper sheets, the corner separators 228 and the feed rollers 202 are lowered against the stack by raising the hand lever 250. The feed rollers 202 are rotated intermittently in a counterclockwise direction so as to advance the topmost sheet. The corners of the top sheet engage the front stops 230 and are buckled rearwardly until they snap over the diagonal edges 238 on the lips 232. This frees the topmost sheet from the stack so that the sheets may be fed to the duplicator or printing machine. The friction between the topmost sheet and the second sheet is insufficient to buckle the second sheet around the corner separators 228. Thus, reliable feeding of a single sheet is achieved.

As the stack is depleted, the lips 232 of the corner separators 228 are held against the corners of the stack by the weight of the separators and the supporting arms 244. Thus, the separators 228 follow the top of the stack downwardly. Each sheet in the stack is fed individually, even the lowermost sheet. The friction pads 224 restrain forward movement of the lowermost sheet until the sheet is actually to be fed.

It will be apparent that the present invention provides a sheet-separating mechanism whereby single sheets may be fed from a stack with a high degree of reliability. The mechanism may readily be adjusted to handle sheets of various sizes and weights. At the same time, the adjustments are not critical.

As the side rails are adjusted to accommodate sheets of various sizes, the corner separators are automatically carried along so that the proper relationship is maintained between the separators and the corners of the stack.

Various modifications, alternative constructions, and equivalents may be employed without departing from the true spirit and scope of the invention, as exemplified in the foregoing description and defined in the following claims.

I claim:

1. In a printing machine, the combination comprising a feed table for supporting a stack of sheets, a pair of side rails mounted on said feed table for lateral adjusting movement to position and guide the edges of the paper sheets, means for advancing the topmost sheets from the stack on the feed table, a pair of corner separators including narrow generally vertical front stops disposed generally in front of said side rails and extending inwardly therebetween for engagement with the front edges of the sheets adjacent to the front corners thereof, each of said stops having a rearwardly projecting lip engageable with the upper side of the topmost sheet at one front corner thereof, each of said lips having a diagonal inner edge adapted to extend across the corner of the topmost sheet, a pair of arms supporting said front stops and lips for generally vertical swinging movement, means pivotally mounting said arms on said feed table rearwardly of said stops, means connecting each of said corner separator stops to one of said side rails for lateral adjusting movement therewith to maintain said stops and lips in constant relation to said side rails, a manually swingable control lever mounted on said feed table and having a crank portion for swinging said arms upwardly and thereby raising said lips to provide for placement of a paper stack on said feed table and under said lips, and means operable by said control lever for lifting said sheet advancing means clear of said feed table simultaneously with the raising movement of said lips.

2. In a duplicator, the combination comprising a feed table for supporting a stack of paper sheets, a pair of side rails mounted on said feed table for lateral adjustment movement to position and guide the lateral edges of the sheets, sheet advancing means for engaging and advancing the topmost sheet from the stack, a pair of corner separators mounted on said feed table for generally vertical movement and disposed generally in front of said side rails for engaging the stack adjacent to the front corners of the sheets, each of said separators comprising a generally vertical front stop extending inwardly of one of said side rails for engaging the front edges of the sheets adjacent to the corners thereof, each of said stops having a separator lip projecting rearwardly in a generally horizontal direction from the upper end thereof for resting upon the topmost sheet at the front corner thereof, a manually movable control member mounted on said feed table and having means for raising said separators to provide for placement of a paper stack on said feed table and under said lips, means connecting said separators to said side rails for lateral adjusting movement therewith, and means operable by said control member for raising said sheet advancing means clear of said feed table simultaneously with the raising movement of said separators.

3. In a duplicator, the combination comprising a feed table for supporting a stack of paper sheets, a pair of side rails mounted on said feed table for lateral adjusting movement to position and guide the edges of the sheets, a sheet advancing member engageable with the topmost sheet in the stack for advancing the topmost sheet from the feed table, a carriage supporting said sheet advancing member for generally vertical movement, a pair of corner separators disposed in front of said side rails at the front corners of the stack, a pair of arms supporting said separators for generally vertical movement, each of said separators having a generally vertical front stop projecting inwardly of one of said side rails for engaging the front edges of the sheets adjacent to the front corners thereof, each of said stops having a rearwardly projecting generally horizontal lip adapted to rest upon the front corner of the topmost sheet, means connecting said separators to said side rails for lateral adjusting movement therewith, a manually operable control lever having a crank thereon for swinging said arms upwardly and thereby raising said separators, an additional lever swingable upwardly by said crank and means connected to said additional lever and engageable with said carriage for raising said sheet advancing member simultaneously with movement of said separators.

4. In a duplicator, the combination comprising a feed table for supporting a stack of paper sheets, a pair of side rails mounted on said feed table for lateral adjusting movement to position and guide the edges of the sheets, a sheet advancing member engageable with the topmost sheet in the stack for advancing the topmost sheet from the feed table, a carriage supporting said sheet advancing member for generally vertical movement, a pair of corner separators disposed in front of said side rails at the front corners of the stack, a pair of arms supporting said separators for generally vertical movement, each of said separators having a generally vertical front stop projecting inwardly of one of said side rails for engaging the front edges of the sheets adjacent to the front corners thereof, each of said stops having a rearwardly projecting generally horizontal lip adapted to rest upon the front corner of the topmost sheet, means connecting said separators to said side rails for lateral adjusting movement therewith, a manually operable control lever having a crank thereon for swinging said arms upwardly and thereby raising said separators, an additional lever swingable upwardly by said crank, means connected to said additional lever and engageable with said carriage for raising said sheet advancing member simultaneously with movement of said separators, yieldable means connected to said additional lever for exerting an upward biasing force on said carriage to reduce the downward force exerted by said sheet advancing member on the topmost sheet, and means for adjusting the effective strength of said yieldable means.

5. In a duplicator, the combination comprising a feed table for supporting a stack of paper sheets, a pair of side rails mounted on said feed table to position and guide the edges of the sheets, a sheet advancing member engageable with the topmost sheet in the stack for advancing the topmost sheet from the feed table, a carriage supporting said sheet advancing member for generally vertical movement, a pair of corner separators disposed in front of said side rails at the front corners of the stack, a pair of arms supporting said separators for generally vertical movement, each of said separators having a generally vertical front stop disposed inwardly of one of said side rails for engaging the front edges of the sheets adjacent to the front corners thereof, each of said stops having a rearwardly projecting generally horizontal lip adapted to rest upon the front corner of the topmost sheet, a manually operable control lever having a crank thereon for swinging said arms upwardly and thereby raising said separators, and an additional lever swingable upwardly by said crank for raising said sheet advancing member simultaneously with raising movement of said separators.

6. In a duplicator, the combination comprising a feed table for supporting a stack of paper sheets, a pair of side rails mounted on said feed table to position and guide the lateral edges of the sheets, sheet advancing means for engaging and advancing the topmost sheet from the stack, a pair of corner separators mounted at the front of said feed table for generally vertical movement and disposed generally in front of said side rails for engaging the stack adjacent to the front corners of the sheets, each of said separators comprising a generally vertical front stop disposed inwardly of one of said side rails for engaging the front edges of the sheets adjacent to the corners thereof, each of said stops having a generally triangular separator lip projecting rearwardly in a generally horizontal direction from the upper end thereof for resting upon the topmost sheet at the front corner thereof, manually movable control means for raising said separators to provide for placement of a paper stack on said feed table and under said lips, and additional means connected to and operable by said control means for raising said sheet advancing means clear of said feed table simultaneously with the raising movement of said separators.

7. In a duplicator, the combination comprising a feed table for supporting a stack of paper sheets, a pair of side rails mounted on said feed table to position and guide the lateral edges of the sheets, sheet advancing means for engaging and advancing the topmost sheet from the stack, a pair of corner separators mounted at the front of said feed table for generally vertical movement and disposed generally in front of said side rails for engaging the stack adjacent to the front corners of the sheets, each of said separators comprising a generally vertical front stop disposed inwardly of one of said side rails for engaging the front edges of the sheets adjacent to the corners thereof, each of said stops having a generally triangular separator lip projecting rearwardly in a generally horizontal direction from the upper end thereof for resting upon the topmost sheet at the front corner thereof, manually movable control means for raising said separators to provide for placement of a paper stack on said feed table and under said lips, and a lever connected to and operable by said control means for raising said sheet advancing means clear of said feed table simultaneously with the raising movement of said separators.

8. In a duplicator, the combination comprising a feed table for supporting a stack of paper sheets, a pair of side rails mounted on said feed table to position and guide the lateral edges of the sheets, sheet advancing means for engaging and advancing the topmost sheet from the stack, a pair of corner separators mounted at the front of said feed table for generally vertical movement and disposed generally in front of said side rails for engaging the stack adjacent to the front corners of the sheets, each of said separators comprising a generally vertical front stop disposed inwardly of one of said side rails for engaging the front edges of the sheets adjacent to the corners thereof, each of said stops having a generally triangular separator lip projecting rearwardly in a generally horizontal direction from the upper end thereof for resting upon the topmost sheet at the front corner thereof, manually movable control means for raising said separators to provide for placement of a paper stack on said feed table and under said lips, a lever connected to and operable by said control means, and a link connected to said lever for engaging and raising said sheet advancing means clear of said feed table simultaneously with the raising movement of said separators.

9. In a duplicator, the combination comprising a feed table for supporting a stack of paper sheets, a pair of side rails mounted on said feed table to position and guide the lateral edges of the sheets, sheet advancing means for engaging and advancing the topmost sheet from the stack, a pair of corner separators mounted on said feed table for generally vertical movement and disposed generally in front of said side rails for engaging the stack adjacent to the front corners of the sheets, each of said separators comprising a generally vertical front stop disposed inwardly of one of said side rails for engaging the front edges of the sheets adjacent to the corners thereof, each of said stops having a separator lip projecting rearwardly in a generally horizontal direction from the upper end thereof for resting upon the topmost sheet at the front corner thereof, manually movable control means for raising said separators to provide for placement of a paper stack on said feed table and under said lips, and additional means operable by said control means for raising said sheet advancing means clear of said feed table simultaneously with the raising movement of said separators, said additional means including yieldable means for exerting an upward biasing force on said sheet advancing means to reduce the downward force exerted by said sheet advancing means on the paper stack, and means for adjusting the effective strength of said yieldable means.

10. In a duplicator, the combination comprising a feed table for supporting a stack of paper sheets, a pair of side rails mounted on said feed table to position and guide the lateral edges of the sheets, sheet advancing means for engaging and advancing the topmost sheet from the stack, a pair of corner separators mounted on said feed table for generally vertical movement and disposed generally in front of said side rails for engaging the stack adjacent to the front corners of the sheets, each of said separators comprising a generally vertical front stop disposed inwardly of one of said side rails for engaging the front edges of the sheets adjacent to the corners thereof, each of said stops having a separator lip projecting rearwardly in a generally horizontal direction from the upper end thereof for resting upon the topmost sheet at the front corner thereof, manually movable control means for raising said separators to provide for placement of a paper stack on said feed table and under said lips, a spring connected to said lever for reducing the downward pressure of said sheet advancing means on said stack, and means for adjusting the force of said spring.

11. In a duplicator, the combination comprising a feed table for supporting a stack of paper sheets, a pair of side rails mounted on said feed table for lateral adjustment movement to position and guide the lateral edges of the sheets, sheet advancing means for engaging and advancing the topmost sheet from the stack, a pair of corner separators mounted on said feed table for generally vertical movement and disposed generally in front of said side rails for engaging the stack adjacent to the front corners of the sheets, each of said separators comprising a generally vertical front stop extending inwardly of one of said side rails for engaging the front edges of the sheets adjacent to the corners thereof, each of said stops having a separator lip projecting rearwardly in a generally horizontal direction from the upper end thereof for resting upon the topmost sheet at the front corner thereof, guide means on each of said side rails for receiving and laterally confining the corresponding front stops to carry along said separators with adjusting movement of said side rails.

12. In a duplicator, the combination comprising a feed table for supporting a stack of paper sheets, a pair of side rails mounted on said feed table for lateral adjustment movement to position and guide the lateral edges of the sheets, sheet advancing means for engaging and advancing the topmost sheet from the stack, a pair of corner separators mounted on said feed table for generally vertical movement and disposed generally in front of said side rails for engaging the stack adjacent to the front corners of the sheets, each of said separators comprising a generally vertical front stop extending inwardly of one of said side rails for engaging the front edges of the sheets adjacent to the corners thereof, each of said stops having a separator lip projecting rearwardly in a generally horizontal direction from the upper end thereof for resting upon the topmost sheet at the front corner thereof, and means on each of said side rails having a guide slot therein receiving and laterally confining the corresponding front stop therein to carry along said separators with adjusting movement of said side rails.

References Cited in the file of this patent
UNITED STATES PATENTS

| | | |
|---|---|---|
| 825,186 | Brown | July 3, 1906 |
| 1,561,821 | Bessat et al. | Nov. 17, 1925 |
| 2,260,330 | Neal | Oct. 28, 1941 |
| 2,795,419 | Ritzerfeld et al. | June 11, 1957 |